(12) United States Patent
Bürgel

(10) Patent No.: US 9,334,126 B2
(45) Date of Patent: May 10, 2016

(54) APPARATUS AND METHOD FOR DISPENSING VEHICLE BALANCING WEIGHTS

(71) Applicant: Wegmann Automotive GmbH & Co. KG, Veitshöchheim (DE)

(72) Inventor: Hans-Ulrich Bürgel, Roden (DE)

(73) Assignee: WEGMANN AUTOMOTIVE GMBH & CO. KG, Veitshöchheim (DE)

( * ) Notice: Subject to any disclaimer, the term of this patent is extended or adjusted under 35 U.S.C. 154(b) by 0 days.

(21) Appl. No.: 14/918,932

(22) Filed: Oct. 21, 2015

(65) Prior Publication Data

US 2016/0039616 A1 Feb. 11, 2016

Related U.S. Application Data

(63) Continuation of application No. PCT/EP2014/057332, filed on Apr. 11, 2014.

(30) Foreign Application Priority Data

Apr. 24, 2013 (EP) ..................................... 13165226

(51) Int. Cl.
*B65G 59/06* (2006.01)
*B65G 47/74* (2006.01)
*B65G 47/71* (2006.01)

(52) U.S. Cl.
CPC ................. *B65G 47/74* (2013.01); *B65G 47/71* (2013.01)

(58) Field of Classification Search
CPC .............................. B65G 59/06; B65G 59/067
USPC ......... 198/540, 543; 414/797.4, 797.6, 797.9; 221/92, 107, 110, 115, 120; 53/443; 271/9.01, 9.13
See application file for complete search history.

(56) References Cited

U.S. PATENT DOCUMENTS

| 2,715,950 | A | * | 8/1955 | Law | B65G 1/06 186/55 |
|---|---|---|---|---|---|
| 3,669,308 | A | * | 6/1972 | Werner | B65G 11/063 198/560 |
| 4,963,072 | A | * | 10/1990 | Miley | B65G 59/066 221/221 |
| 5,271,703 | A | * | 12/1993 | Lindqvist | G06Q 10/08 186/55 |
| 5,439,345 | A | * | 8/1995 | Ivo | B65G 1/08 221/133 |
| 5,454,212 | A | * | 10/1995 | Tanaka | B65B 5/10 53/252 |
| 5,484,062 | A | * | 1/1996 | Rich | B65G 59/063 209/587 |
| 5,630,309 | A | * | 5/1997 | Blidung | B65B 43/126 198/347.4 |

(Continued)

FOREIGN PATENT DOCUMENTS

| DE | 2745858 A1 | 4/1979 |
|---|---|---|
| DE | 8313868 U1 | 9/2008 |

(Continued)

*Primary Examiner* — Douglas Hess
(74) *Attorney, Agent, or Firm* — Yakov Sidorin; Quarles & Brady, LLP

(57) ABSTRACT

An apparatus and a method for dispensing vehicle balancing weights are disclosed. The dispenser comprises a plurality of transport units arranged below cartridges for storing and transporting balancing weights. The transport units move balancing weights from a selected section of the cartridges to two belt conveyors for further transporting the balancing weights to a handling device. Each transport unit comprises a feeder, whereas the feeders push selected balancing weights towards belt conveyors.

11 Claims, 4 Drawing Sheets

(56) References Cited

U.S. PATENT DOCUMENTS

| | | | | |
|---|---|---|---|---|
| 5,810,346 A * | 9/1998 | Jorg | ............ | B65H 39/02 198/349.9 |
| 5,904,467 A * | 5/1999 | Kang | ............ | B23Q 7/16 221/95 |
| 5,913,656 A * | 6/1999 | Collins | ............ | B65H 29/001 271/9.01 |
| 5,996,316 A * | 12/1999 | Kirschner | ............ | B65G 1/1378 53/155 |
| 6,098,379 A * | 8/2000 | Spatafora | ............ | B65B 35/04 414/788.9 |
| 6,151,866 A * | 11/2000 | Connell | ............ | G01G 19/38 209/657 |
| 6,168,149 B1 * | 1/2001 | Boldrini | ............ | B65H 3/085 271/107 |
| 6,247,890 B1 * | 6/2001 | Chang | ............ | B65G 1/1376 414/795.7 |
| 6,494,019 B1 * | 12/2002 | Lingle | ............ | B43M 3/045 414/797.4 |
| 6,789,996 B2 * | 9/2004 | Yuyama | ............ | G07F 11/04 221/251 |
| 7,331,440 B2 * | 2/2008 | Lafontaine | ............ | B65G 1/08 198/347.4 |
| 8,083,462 B2 * | 12/2011 | Barge | ............ | B65G 21/2036 198/689.1 |
| 8,226,345 B2 * | 7/2012 | De Leo | ............ | B65B 5/06 198/403 |
| 8,505,423 B2 * | 8/2013 | Hedtke | ............ | B26D 5/20 83/109 |
| 8,943,940 B2 * | 2/2015 | Hedtke, Jr. | ............ | B26D 5/20 73/468 |
| 2005/0285323 A1 * | 12/2005 | Gulbrandsen et al. | | |

FOREIGN PATENT DOCUMENTS

| | | |
|---|---|---|
| DE | 102011054581 A1 | 4/2013 |
| GB | 1408674 A1 | 10/1975 |

* cited by examiner

APPARATUS AND METHOD FOR DISPENSING VEHICLE BALANCING WEIGHTS

CROSS-REFERENCE TO RELATED APPLICATIONS

This application claims priority to pending European Application No. 13165226.5 filed on Apr. 24, 2013. This application is a continuation of pending International Application No. PCT/EP2014/057332 filed on 11 Apr. 2014, which designates the United States and claims priority from European Application No. 13165226.5 filed on Apr. 24, 2013.

BACKGROUND

1. Field of the Invention

The invention relates to methods and devices for dispensing weights used in vehicle ballasting applications, in particular for dispensing weights used in balancing automobile or other vehicle wheels.

2. Description of Relevant Art

In automotive wheel balancing, individual wheel balancing weights are applied to specific positions of a rim. Basically, two types of balancing weight are used. The first kind is a balancing weight which is attached by a clamp, as disclosed in the European patent EP 1 613 876 B1, while the second kind is fixed by means of a self-adhesive tape, as disclosed in U.S. Pat. No. 6,364,421 B1.

Both kinds of balancing weights are available in a plurality of sizes, resulting in different weights. When balancing a vehicle wheel, the correct size of balancing weight is selected and attached to the rim, mostly by an automated handling system, such as an industrial robot. Most balancing weights are supplied as bulk material in boxes, from which the required number of weights is manually taken.

This allows for a simple, comparatively cheap supply of balancing weights. The drawback is that the person who is taking the weights from the box may take a wrong weight, and therefore a further step of balancing is required. Furthermore, the process of taking the weights can hardly be automated. Therefore, other solutions as disclosed in WO 2008/103651 A1, using a continuous polymer tape, have been developed. This solution has the drawback that a solid balancing weight is significantly more robust and reliable than the continuous tapes it is used with.

DE 27 45 858 A1 discloses an apparatus for dispensing of components from a cartridge by means of a transport unit and a single belt conveyor.

SUMMARY

The embodiments of the present invention provide an apparatus and a method for automatic dispensing of vehicle balancing weights and acceleration of the process of placing balancing weights to a rim. The weights should be dispensed in such a way that they can be handled by an automatic handling system for applying the weights to a rim.

In most cases, pairs of balancing weights are used for balancing vehicle wheels. A first weight is placed at the outer side of the rim of the wheel while a second weight is placed at the inner side of the rim. With a dispensing apparatus as known from prior art, a handling system has to move to the dispenser, pick up a balancing weight, move to the rim and place the balancing weight thereon. This process is at least performed twice, once for the outer weight and once for the inner weight.

In contradistinction, in a first embodiment of the invention, an apparatus for automatic dispensing of the balancing weights is configured to deliver two balancing weights at the same time. These two balancing weights may be picked up by the handling device in a single step, preferably by using a dual balancing weight holding head. They can be moved together to the rim and placed thereon. As a result of using the dispensing apparatus of this embodiment, the time for placing the balancing weights to a rim is significantly reduced, to about one half of the time which was required previously when apparatus of related art were employed. In a further embodiment, the dispensing apparatus provides two different balancing weights at the same time. This is useful, as often the weights, which are required for balancing at the inner side and outer side of the wheel, are different from one another.

At least one first cartridge is attached to at least one first transport unit for holding and selecting individual weights from the first cartridge and moving the selected weights to a first belt conveyor in front of the drive unit. The at least one first cartridge includes a plurality of first trays; each of such trays is structured to hold vehicle balancing weights. In a related implementation, the trays are designed to hold a plurality of different balancing weights and/or configured to hold balancing weights of specific sizes. The trays may have a visible and/or computer readable encoding of at least one of tray size, tray capacity, balancing weight size, quantity of balancing weights in the tray. Such encoding is effectuated, for example, with a printed code such as a number, a bar code, or an electronic code such as a transponder or a memory chip, which may be contacted by a microcontroller. Such an encoding may also be applied to the at least one cartridge. Furthermore, it is preferred that each tray comprises at least one first section, preferably at least two first sections or a plurality of sections, suited to accommodate different balancing weights. Each section may contain a single stack or a plurality of stacks of balancing weights. Preferably, there are successive stacks or sections.

In addition, at least one second cartridge is attached to at least one second transport unit for selecting additional individual weights from the second cartridge and moving the selected weights to a second belt conveyor in front of the drive unit. The at least one second cartridge includes a plurality of second trays, each of which second trays is configured to hold vehicle balancing weights. The trays may be designed to hold a plurality of different balancing weights. They furthermore may be adapted to specific sizes of balancing weights. These second trays may have a visible and/or computer readable encoding of at least one of tray size, tray capacity, balancing weight size, quantity of balancing weights in the tray. This may be achieved with the use of a printed code such as a number, a bar code, or an electronic code such as a transponder or a memory chip, which may be operably addressed by a microcontroller. Such an encoding may also be applied to the at least one second cartridge. Furthermore, it is preferred, if each second tray comprises at least one second section, preferably at least two second sections or a plurality of sections, which may be suited for, accommodating different balancing weights. Each section may contain a single stack or a plurality of stacks of balancing weights. Preferably, there are successive stacks or sections.

Each of the transport units may comprise at least one feeder for moving a selected balancing weight from a specific first or second section of one of the related first or second trays to the related first or second belt conveyor. The feeder preferably performs a linear movement and preferably is driven by a linear drive, such as a pneumatic or hydraulic actuator. The first or second feeder is moving one selected balancing weight to the related belt conveyor, which is lying on a transport surface from a tray section. The feeder may be operated in a mode described thereinafter. The balancing weights are accessed sequentially. Here, the feeder is pulled back from the belt conveyor with its end to a position behind the first section closest to the belt conveyor, but before the second section. When the feeder has reached this position, the whole stack of balancing weights in the first section falls down so that the balancing weight at the bottom lies on a transport surface. Thereafter, the feeder may be pushed forward, pushing the bottom balancing weight towards the belt conveyor, until the balancing weight falls on the belt conveyor. Then, the cycle is repeated again. If one section is empty, the procedure is repeated with the next section until all sections are empty. In a different embodiment of the feeder, the feeder may have an opening suited for accommodating one balancing weight. In this embodiment, the feeder is also pulled back from the belt conveyor until the balancing weight at the bottom of the first section closest to the belt conveyor can fall into this opening. Then, the direction of the feeder is reverted towards the belt conveyor and the balancing weight is transported to the belt conveyor. After all balancing weights of the section have been transported to the belt conveyor, the feeder moves until it reaches the next section containing balancing weights, which may be another section of the first or second sections, and repeats the same procedure as before. In this way, one section after the other may be emptied.

As disclosed, any section of a tray may be selected for delivering a balancing weight to the belt conveyor. In a first embodiment, all sections of a tray may contain the same size of balancing weights, although it is also possible to use different sizes of balancing weights within different sections of the same tray. Furthermore, it may be possible to use different sections with different colors and/or design and/or shape of balancing weights, preferably of the same size. In addition, various types of balancing weights may be used. A first type of balancing weights comprises a mounting clip for fastening the balancing weight to the rim. Such a mounting clip may comprise a spring. A second type of balancing weighs comprises a self-adhesive portion for fastening the balancing weights to the rim.

For a first embodiment, the first and second cartridge may contain different balancing weights with mounting clips only, which are preferably attached to steel rims. Thus, an assorted pair of matching balancing weights is selected and may be transferred to the handling device for mounting the balancing weights on opposite sides of a rim. The rim is equipped with determined balancing weights in a single step. A second embodiment uses the first and second cartridges charged with different types of balancing weights. For example, the first cartridge contains balancing weights with mounting clips, and the second cartridge contains self-adhesive balancing weights, which are preferably used for light-alloy rims. For a third embodiment, the first and second cartridges just contain self-adhesive balancing weights, which are preferably used for light-alloy rims.

By using the apparatus disclosed herein, balancing weights may be selected and delivered with a comparatively high speed. Furthermore, by using multiple cartridges and/or trays in parallel, containing the same type of balancing weight, the speed of deliverance, which may be limited by mass inertia, specifically of the stacks of balancing weights, may be increased. When a section of the cartridge has become empty, it may be continuously refilled during operation without affecting operation. In an alternative embodiment, individual sections, trays, or cartridges may be replaced by refilled sections trays or cartridges. In a further embodiment, at least two sections, trays, or cartridges may be used in parallel to each of the first and second belt conveyor, while one first or second section is in operation, and the other is being replaced or being refilled.

In a further embodiment, the first and second conveyors are arranged in parallel running, preferably located side-by-side. Therefore, the first and second cartridges may be located on opposite sides of the belt conveyors. The handling device may pick up the transferred balancing weights in a limited area at the end of the belt conveyors. Preferably, each belt conveyor comprises an individual drive unit for respective movement of each belt conveyor.

In a further embodiment, each belt conveyor comprises at least one transport slide mounted on the belt. The transport slide receives at least one balancing weight transferred by the transport unit in order to deliver the balancing weight to the handling device. The transport slide may comprise a cavity for receiving at least one balancing weight. The balancing weights can be transferred safely to the end of the belt conveyor.

In a further embodiment, at least one tray of the first and/or second cartridge has at least one inclined slide guide, i.e. a slideway, on which the balancing weights are slidable supported. Preferably, the angle of the inclined slideway may be 45°, more or less relative to the horizontal. The inclined slideway compensates different balance points of different balancing weights.

In a further embodiment, at least one section comprises a slotted and inclined slideway. The slotted slideway is separated in two paths with the same inclination allowing a slidable support of the balancing weights that have mounting clips. When such balancing weights are within the section, the mounting clips extend into the slot between the two paths.

In a further embodiment, at least one tray comprises adaptable sidewalls for receiving balancing weights with different sizes and shapes as described above.

A further embodiment provides a method for dispensing vehicle balancing weights. The method includes at least the steps of providing balancing weights within a first and second cartridge, each preferably comprising at least one tray and further comprising at least one section containing at least one balancing weight. The further steps include taking at least one balancing weight out of each cartridge and transporting the balancing weights to a handling device via at least two different conveyors, and selecting at least one section and transporting by a transport unit the bottommost balancing weight of the section to a related belt conveyor. A further step includes transporting the selected balancing weight by the belt conveyor to at least one chute or tray.

In a further embodiment, the cartridge, the trays, or sections thereof are removable or exchangeable.

Preferably, two belt conveyors are used to transfer at least two balancing weights from the transport units to a handling device. This may be any automated system like an industrial robot. In specific cases, the balancing weights may also be manually handled. There may be any intermediate device like a chute or trays.

In a further embodiment, a controller is provided for controlling the transport units. The controller may receive as an input signal a parameter describing which type of balancing weight is desired or describing a specific section and/or tray and/or cartridge from which a balancing weight is desired. It may further supply a time at which the balancing weight should be delivered. The controller is then controlling the transport units and preferably the belt conveyors in such a way, that the selected balancing weights are received at the end of the belt conveyors at the optionally specified time.

Furthermore, it evaluates signals from sensors, like sensors for checking the availability of balancing weights in individual sections. It may furthermore evaluate signals from any further sensors. In addition, it may control the speed of the belt conveyor, and/or the position of trays.

The embodiments disclosed herein are applicable to a broad variety of balancing weights such as those which may be held by a clamp, or self-adhesive balancing weights.

BRIEF DESCRIPTION OF THE DRAWINGS

In the following, the embodiments of invention will be described by way of examples, without limitation of the general inventive concept and with reference to the drawings.

Figure 1:
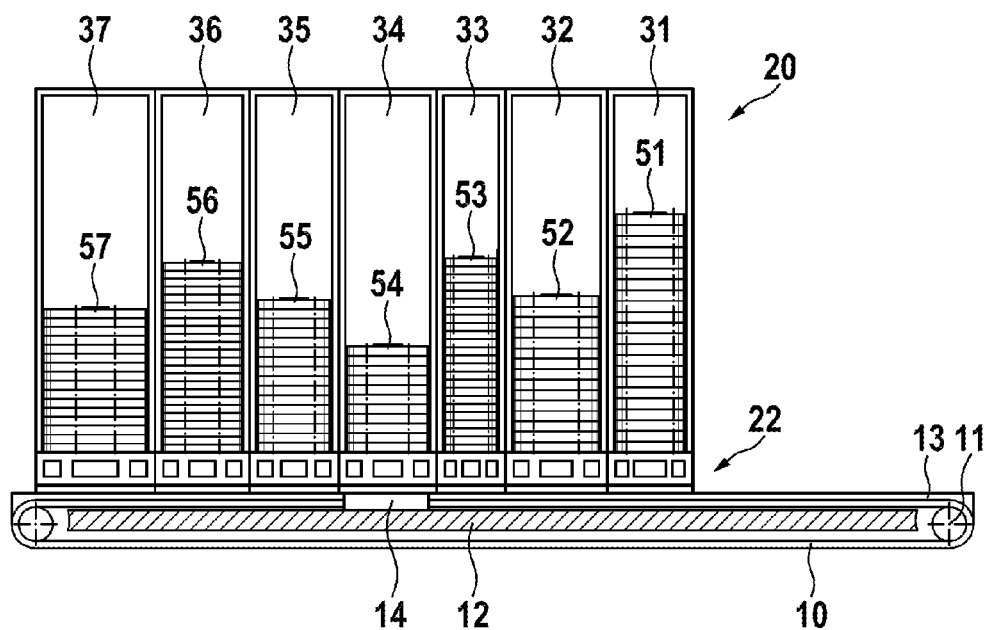
FIG. 1 shows an apparatus for dispensing vehicle balancing weights.

While the invention is susceptible to various modifications and alternative forms, specific embodiments thereof are shown by way of example in the drawings and will herein be described in detail. It should be understood, however, that the drawings and detailed description are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

In FIG. 1, a preferred embodiment is shown. A first belt conveyor 10 is provided for moving balancing weights from a first cartridge 20 to a chute or at least one tray or any other device for further processing the balancing weights which may be attached to any one side of the first belt conveyor. The first belt conveyor 10 may have a conveyor pulley 11, and it further may have a belt support 12, which may increase stability on large lengths of the belt. Below the first cartridge 20, there is at least one first transport unit 22 for transporting balancing weights from the cartridge to the belt conveyor. The first cartridge 20 may comprise of at least one first tray 31 to 37. These trays may be filled with balancing weights 51 to 57. In the individual trays, there may be different numbers, different sizes, different types, different colors, different shapes, and different designs of balancing weights.

Figure 2:
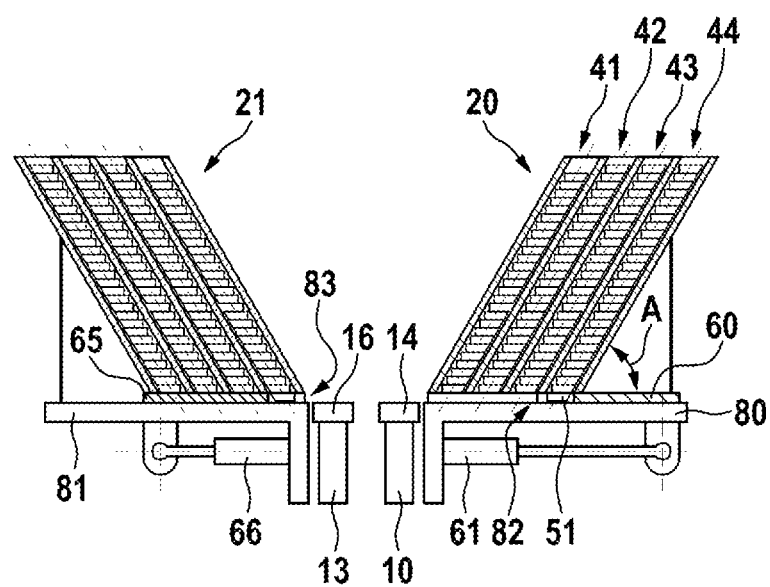
FIG. 2 shows the apparatus in a side view.
Figure 3:
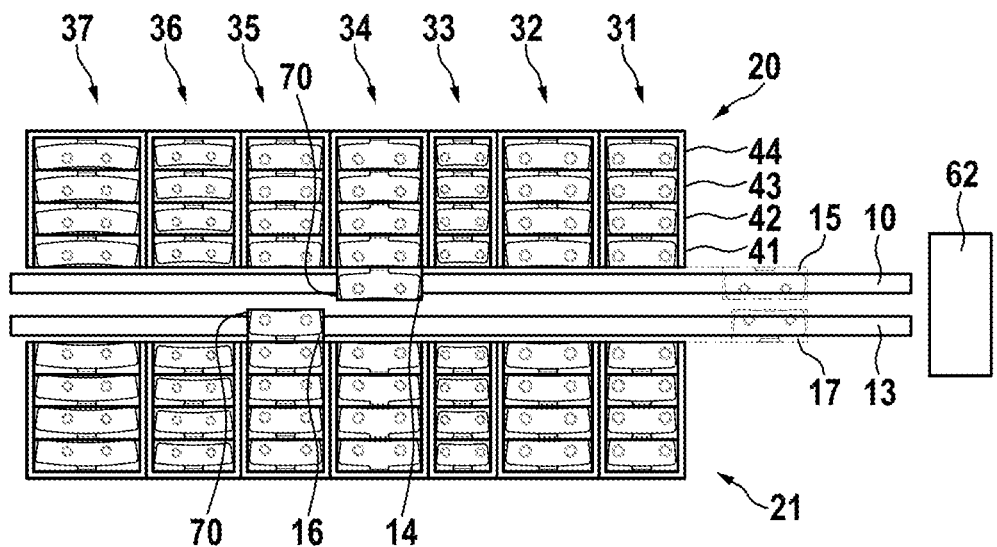
FIG. 3 shows the apparatus in a top view.

According to FIGS. 2 and 3, the dispensing apparatus is shown in a top and a side view. Here, the first cartridge 20 is shown on one side of the first belt conveyor 10. A second belt conveyor 13 is running parallel to the first belt conveyor 10. First and second belt conveyor are located adjacent to each other, in particular side-by-side. On one side of the second belt conveyor 13, a second cartridge 21 is shown. Below the second cartridge 21, there is at least one second transport unit 23 for transporting balancing weights from the second cartridge to the belt conveyor. The first and second cartridges are located on opposite sides of the belt conveyors and the cartridges enclose the belt conveyors in-between. The second belt conveyor may also comprise a belt support and a conveyor pulley as described above in relation to the first belt conveyor. Each cartridge has individual trays 31 to 37, which are further subdivided, into sections 41 to 44. Each tray may have an individual number of sections, although it is preferred to have the same number of sections. The cartridges may have a different number of trays and sections as shown herein. Furthermore, there may be only one of the cartridges at one side of the belt conveyor. Alternatively, there may be a higher number of cartridges, preferably two first and two second cartridges.

Each belt conveyer comprises a transport slide, whereas first transport slide 14 of the first belt conveyer 10 is shown in a first position suitable for receiving at least one balancing weight transferred out of the first cartridge 20 through the first transport unit 22, and first transport slide is shown in a second position 15 out of the space between the cartridges and near the end of the first belt conveyor. Second transport slide 16 of the second belt conveyor 13 is shown in a first position 16 suitable for receiving at least one balancing weight transferred out of the second cartridge 21 through the second transport unit 23. The transfer direction for the balancing weights out of the cartridges and towards the belt conveyors is perpendicular to the transfer direction of the belt conveyors. A second position 17 of the second transport slide is therefore out of the space between the cartridges and near the end of the second belt conveyor 13. Each transport slide may comprise a cavity 70 for receiving the balancing weights.

Belt conveyors 10 and 13 may be controlled and driven independently. The end of both belt conveyors may be used as a platform for a just schematic shown handling device 62 like an industrial robot to pick up balancing weights for further processing, i.e. mounting on a rim (not shown). Belt conveyors bring the balancing weights into the correct position for picking up, which may be dependent on weight size and type. Since the belt conveyors are controlled and driven independently, at least one transport slide 14 and/or 16 may be in position to receive a balancing weight and the other transport slide 16 and/or 14 may be in a different position, i.e. at a transfer point for forwarding a balancing weight to the handling device 62 at the same time. By using two belt conveyors 10, 13, two cartridges 20, 21, and two transport units 22, 23, transport of balancing weights between the cartridges and the handling device 62 results in significantly increased transfer speed and throughput.

Figure 4:
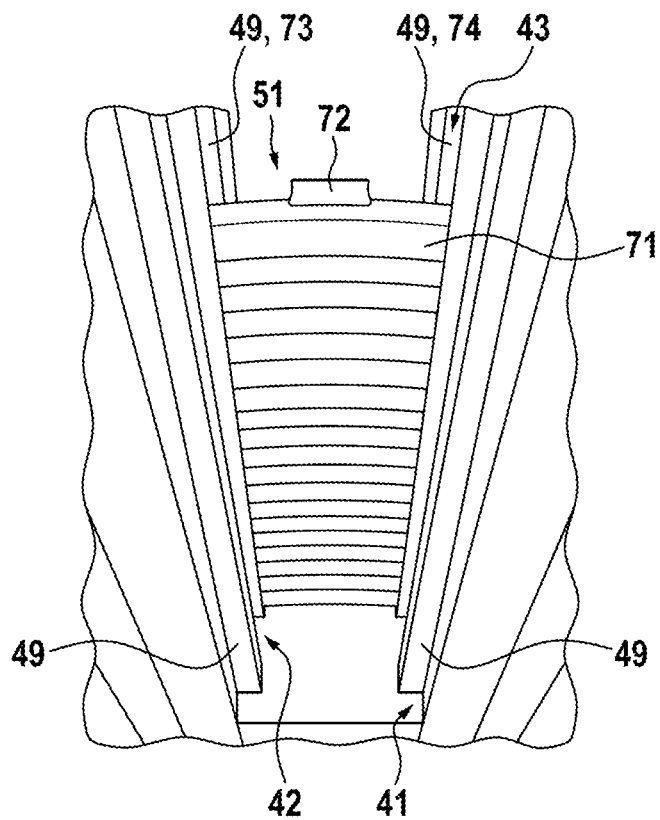
FIG. 4 shows a cartridge in a detailed perspective view.
Figure 5:
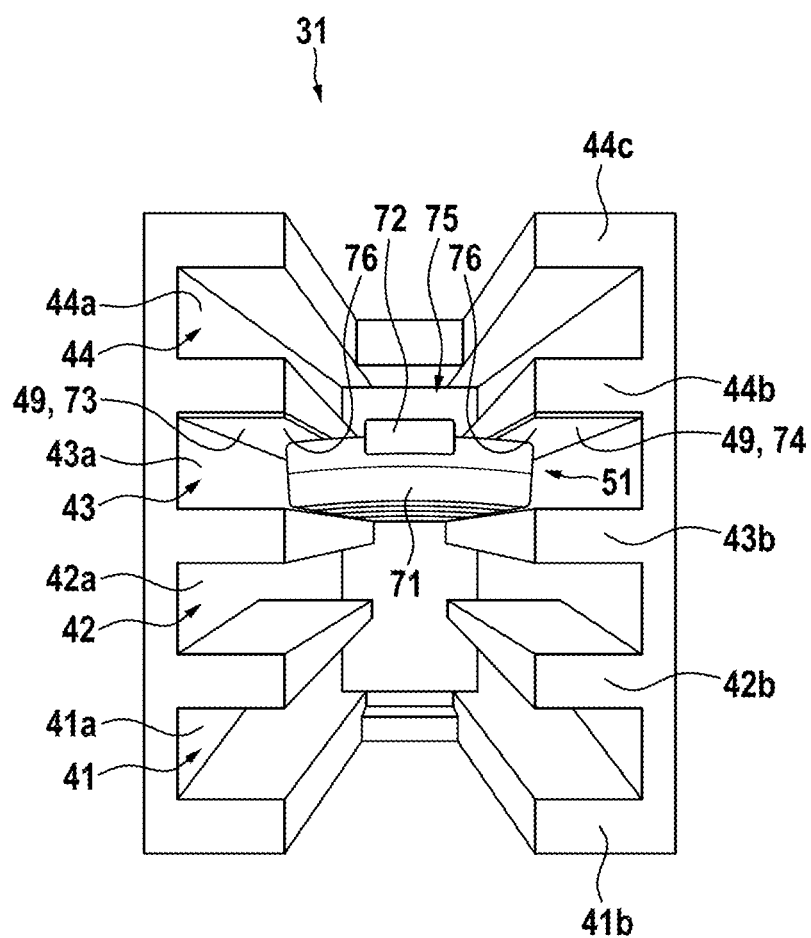
FIG. 5 shows a cartridge in a detailed top view.
Figure 6:
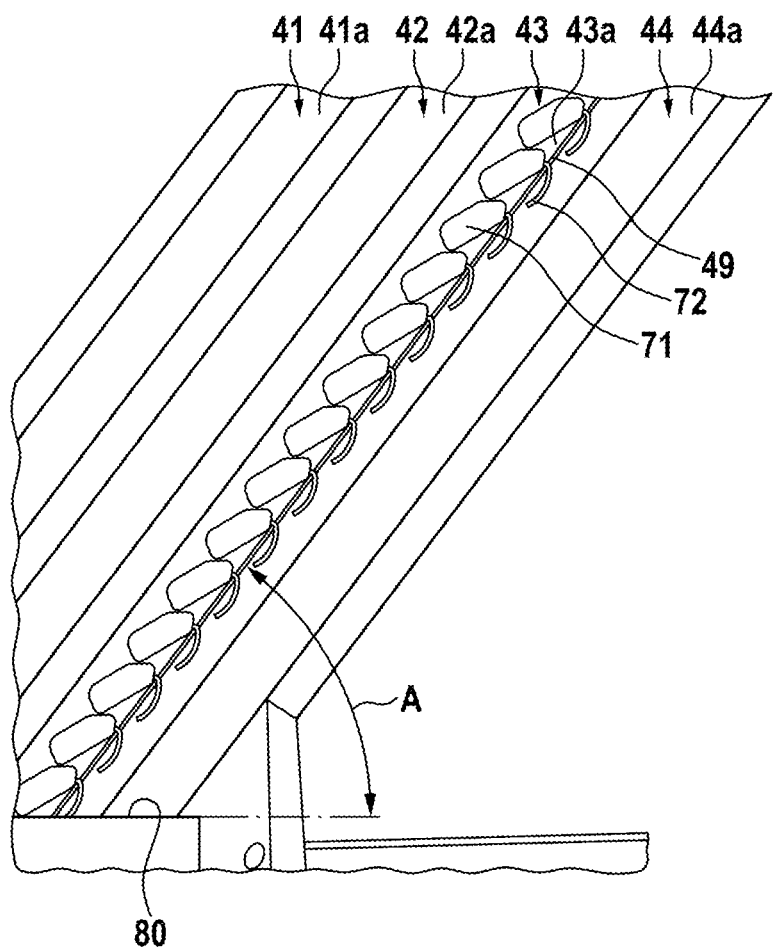
FIG. 6 shows a side view of the cartridge.

In FIGS. 4, 5 and 6 one tray 31 having a plurality of sections 41, 42, 43, 44 is shown. Each section is formed like a duct having left and right side walls 41a, 42a, 43a, 44a, which are adaptable in shape and/or width to receive balancing weights with different shapes and sizes. Therefore, each sidewall may be equipped with a fitting part or a rod, which extend along the sidewalls. In addition, each section or duct have partition walls 41b, 42b, 43b, 44b, 44c forming front and rear walls of the sections or ducts. Each section is therefore formed for receiving one or more balancing weights, preferably as a stack. In a preferred embodiment, the at least one balancing weight 51 is comprised of a mass part 71 and a fastening part, i.e. a mounting clip 72 or clamp. The sections or ducts having a slide guide 49 on its rear walls, which are, formed as inclined slideways; each in turn is separated in two paths 73, 74 having the same inclination. In-between the paths 73, 74 a gap or slot 75 is omitted. Thus, the orientation of the balancing weight 51 within the section may be as shown in FIGS. 5 and 6, whereas the fastening part or mounting clip 72 penetrates the gap or slot 75 between the paths 73, 74.

The inclination angle A of the slide guide 49 may be approximately 45° relative to a horizontal or horizontal plane in which the transport surfaces 80, 81 extend. As depicted in FIG. 2, both cartridges 20, 21 are arranged relative to the belt conveyors in V-shape. According to the force of gravity, the direction of emptying the section is angular downwardly to bring out the bottommost balancing weight with the transport unit 22, 23 to the belt conveyor. According to the inclination angle A, the balancing weights a supported on the slide guide 49, i.e. the paths 73, 74, which may be coated with a slide layer or comprise a slide rail 76 as shown in FIG. 5.

Each transport unit 22, 23 may comprise at least one feeder 60, 65 (see FIG. 2) slidable guided on a mount of the apparatus. The feeders move back and forth to capture at least one balancing weight on transport surfaces 80, 81 that are located under the cartridges 20, 21. The captured balancing weight is pushed on the transport surface 80, 81 towards the belt conveyor 10, 13 until it drops on the transport slide 14, 16 in the receiving position. Each feeder 60, 65 is driven via a linear or feeder drive 61, 66 to move back and forth as described. Furthermore, each feeder may have a cutout section 82 for receiving and capture the balancing weights.

It will be appreciated by those skilled in the art having the benefit of this disclosure that this invention provides an apparatus and a method for automatic dispensing vehicle balancing weights. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS

10 first belt conveyor
11 conveyor pulley
12 belt support
13 second belt conveyor
20 first cartridge
21 second cartridge
22 first transport unit
23 second transport unit
31-37 trays
41-44 first and second sections
41a-44a sidewall
41b-44b partition wall
44c partition wall
51-57 balancing weights
60, 65 feeder
61, 66 feeder drive
62 handling device
70 cavity
71 mass part
72 fastening part
73, 74 path
75 slot
76 layer
80, 81 transport surface
82 cut-out section
A angle

The invention claimed is:

1. An apparatus for dispensing vehicle balancing weights, the apparatus comprising
at least one first cartridge adapted to store at least one balancing weight, the at least one first cartridge further comprising at least two first sections;
a first belt conveyor for transporting at least one balancing weight to a handling device;
at least one first transport unit, located below the at least one first cartridge, for transporting a balancing weight from a selected first section to the first belt conveyor, the at least one first transport unit comprising a feeder for moving the at least one balancing weight from the selected first section and pushing it on the first belt conveyor,
the feeder configured to perform a linear movement into a direction to the first belt conveyor,
at least one second cartridge adapted to store at least one further balancing weight, the at least one second cartridge further comprising at least two second sections;
a second belt conveyor for transporting the at least one further balancing weight to a handling device;
at least one second transport unit, located below the at least one second cartridge, for transporting the at least one further balancing weight from a selected second section to the second belt conveyor,
the at least one second transport unit comprising a feeder for moving the at least one further balancing weight from the selected second section and pushing it on the second belt conveyor,
the feeder configured perform a linear movement into a direction to the second belt conveyor.

2. An apparatus according to claim 1, wherein the first and second belt conveyors are arranged in parallel running.

3. An apparatus according to claim 1, wherein the first belt conveyor is located adjacent to the second belt conveyor, and the first and second cartridges are located on opposite sides of the first and second belt conveyor.

4. An apparatus according to claim 1, wherein each of the first and second belt conveyors comprises at least a transport slide for receiving a balancing weight.

5. An apparatus according to claim 1, wherein at least one of the first and second cartridges having at least two sections is formed as a duct for receiving a balancing weight, whereas the duct comprises at least one inclined slide guide for supporting the balancing weight.

6. An apparatus according to claim 5, wherein the at least one inclined slide guide is slotted to form at least two separate paths with the same inclination angle.

7. An apparatus according to claim 1, wherein at least one section of at least one of the first and second cartridges comprises adaptable side walls for receiving balancing weights with different shape.

8. A method for dispensing vehicle balancing weights by an apparatus for dispensing vehicle balancing weights, the apparatus comprising
at least one first cartridge adapted to store at least one balancing weight, the at least one first cartridge further comprising at least two first sections;
a first belt conveyor for transporting at least one balancing weight to a handling device;
at least one first transport unit located below the at least one first cartridge, for transporting a balancing weight from a selected first section to the first belt conveyor,
the at least one first transport unit comprising a feeder for moving the balancing weight from the selected first section and pushing it on the first belt conveyor,
the feeder configured to perform a linear movement into a direction to the first belt conveyor,
at least one second cartridge adapted to store at least one further balancing weight, the at least one second cartridge further comprising at least two second sections;
a second belt conveyor for transporting the at least one further balancing weight to the handling device;
at least one second transport unit, located below the at least one second cartridge, for transporting the at least one further balancing weight from a selected second section to the second belt conveyor, the at least one second transport unit comprising a feeder for moving the further balancing weight from the selected second section and pushing it on the second belt conveyor, the feeder configured to perform a linear movement into a direction to the second belt conveyor, the method comprising the steps of providing at least two cartridges, each containing at least one balancing weight;

selecting a section of each of the at least two cartridges from which a balancing weight should be taken;

transporting bottommost balancing weights from sections that have been selected, via two different belt conveyors.

9. A method according to claim 8, further comprising transporting the bottommost balancing weights by the first and second belt conveyors to the handling device.

10. A method according to claim 8, further comprising taking a pair of matched balancing weights out of the first and second cartridges and transporting the pair to a rim to provide an assorted pair of balancing weights to the rim.

11. A method according to claim 8, further comprising providing different types of balancing weights for different types of rims.

* * * * *